US006983469B2

(12) United States Patent
Steinhilber

(10) Patent No.: US 6,983,469 B2
(45) Date of Patent: Jan. 3, 2006

(54) MODULAR SYSTEM WITH MULTI-DRIVES AND MULTI-MAGAZINES FOR STORING DATA

(75) Inventor: Friedhelm Steinhilber, Rottweil (DE)

(73) Assignee: BDT Buro-und Datentechnik GmbH & CO KG, Rottweil (DE)

( * ) Notice: Subject to any disclaimer, the term of this patent is extended or adjusted under 35 U.S.C. 154(b) by 345 days.

(21) Appl. No.: 10/081,595

(22) Filed: Feb. 20, 2002

(65) Prior Publication Data

US 2002/0181341 A1 Dec. 5, 2002

Related U.S. Application Data

(60) Provisional application No. 60/270,519, filed on Feb. 21, 2001.

(51) Int. Cl.
*G11B 17/03* (2006.01)

(52) U.S. Cl. .................................... 720/600; 369/30.39

(58) Field of Classification Search .................. 360/92; 369/30.39, 30.43, 30.45; 720/600
See application file for complete search history.

(56) References Cited

U.S. PATENT DOCUMENTS 4,608,679 A * 8/1986 Rudy et al. .............. 369/30.43
4,827,463 A * 5/1989 Motoyoshi et al. ...... 369/30.43
4,903,252 A * 2/1990 Tanaka et al. ........... 369/30.43
5,053,948 A * 10/1991 DeClute et al. ............. 707/200
5,128,912 A * 7/1992 Hug et al. ............... 369/30.61
5,274,516 A * 12/1993 Kakuta et al. ................ 360/92
5,442,500 A * 8/1995 Hidano et al. ................ 360/92
5,663,938 A * 9/1997 Dang et al. .............. 369/30.39
5,742,570 A * 4/1998 Taki et al. ............... 369/30.63
5,760,995 A * 6/1998 Heller et al. .................. 360/92
6,166,877 A * 12/2000 Tadokoro et al. ............. 360/92
6,240,058 B1 * 5/2001 Pitz et al. ................ 369/30.39
6,515,822 B1 * 2/2003 White et al. .................. 360/92
2004/0133902 A1 * 7/2004 Luffel et al. ................ 720/632

* cited by examiner

*Primary Examiner*—David Davis
(74) *Attorney, Agent, or Firm*—Baker Botts L.L.P.

(57) ABSTRACT

A modular data storage system is disclosed. The data storage system comprises at least one module housing. Each housing has a front chamber and a rear chamber running parallel to a front side of the module housing and extending across a width of the module housing. An open shaft is arranged between the front chamber and the rear chamber. The shaft extends across the width of the module housing. The front chamber is adapted to receive at least two storage modules adapted to hold storage media, and the rear chamber is adapted to receive at least one function module for the data storage media. At least one transfer unit is arranged in the shaft. The transfer unit has a vertically traveling elevator and a carriage adapted to travel on the elevator between the front chamber and the rear chamber. The carriage has a grip mechanism for the data storage media.

17 Claims, 6 Drawing Sheets

MODULAR SYSTEM WITH MULTI-DRIVES AND MULTI-MAGAZINES FOR STORING DATA

RELATED APPLICATIONS

The present application claims priority under 35 U.S.C. § 119(e) to U.S. Provisional Patent Application Ser. No. 60/270,519, filed Feb. 21, 2001, which is hereby incorporated by reference in its entirety.

BACKGROUND OF THE INVENTION

1. Field of the Invention

The invention relates to a modular system to store data.

2. Related Art

In electronic data processing, storage media are used for the external storage of data. The data can be recorded on and read from said storage media such as, for example, CDs, DVDs and magnetic tapes. To store large amounts of data, systems are used where a larger number of such storage media are deposited in a magazine. A transfer unit takes the storage media from the magazine and transfers them to a drive where the data are read by the storage media. If the storage media are disks, i.e., CDs or DVDs, such systems are frequently called jukebox systems. If the storage media are magnetic tapes, such systems are frequently called tape libraries.

The known systems of this type have a magazine for a specific type of storage medium and a drive for this type of storage medium. Each system is therefore suitable only for a specific type of storage media. The storage capacity of the system is furthermore limited by the capacity of the magazine.

BRIEF DESCRIPTION OF THE DRAWINGS

In the following the invention will be explained in further detail in conjunction with embodiment examples depicted in the drawings, in which.

DESCRIPTION OF CERTAIN EMBODIMENT OF THE INVENTION

Figure 1:
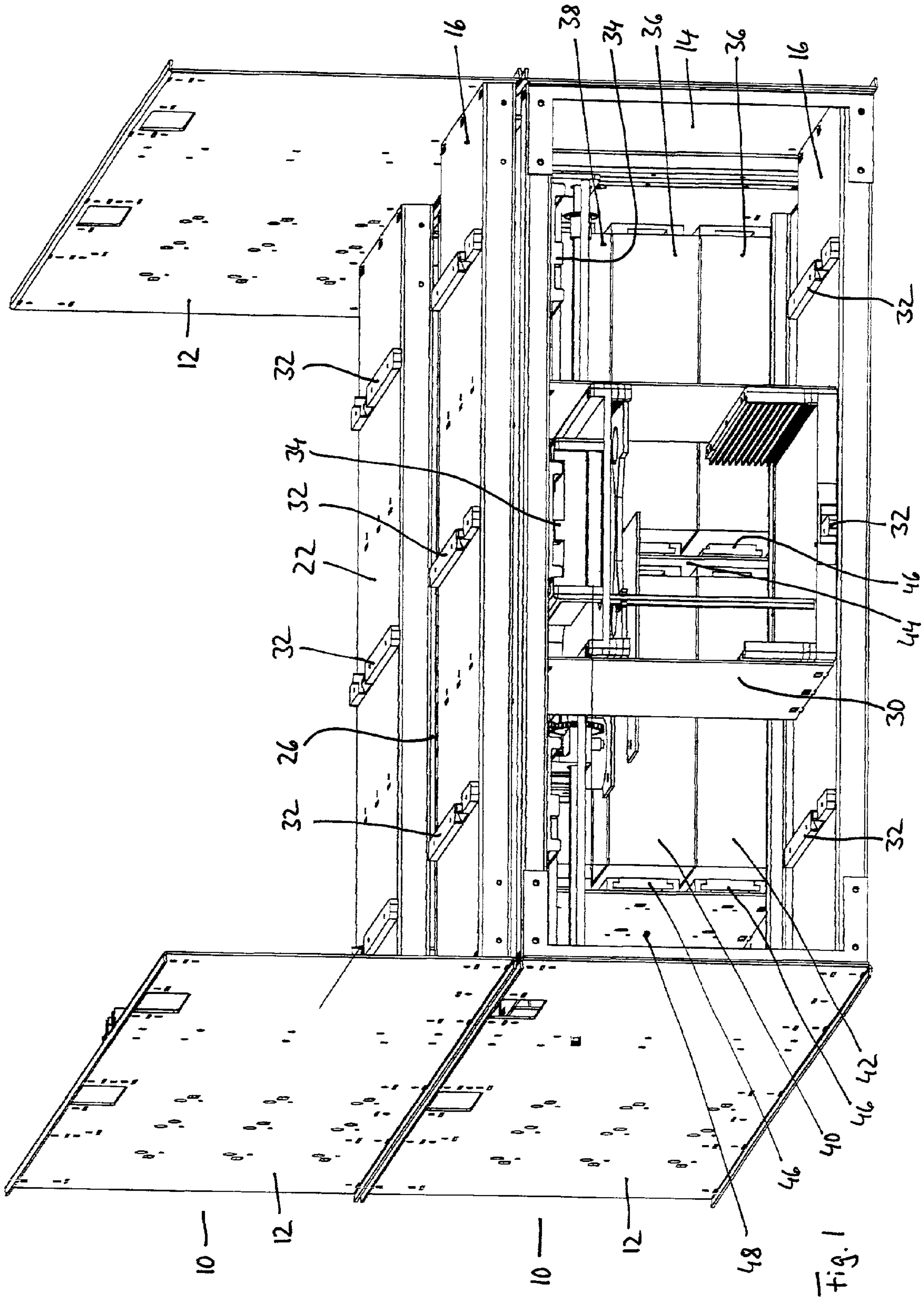
FIG. 1 is a perspective frontal view of a module housing according to the invention, with a partial view of a second stacked module housing.
Figure 2:
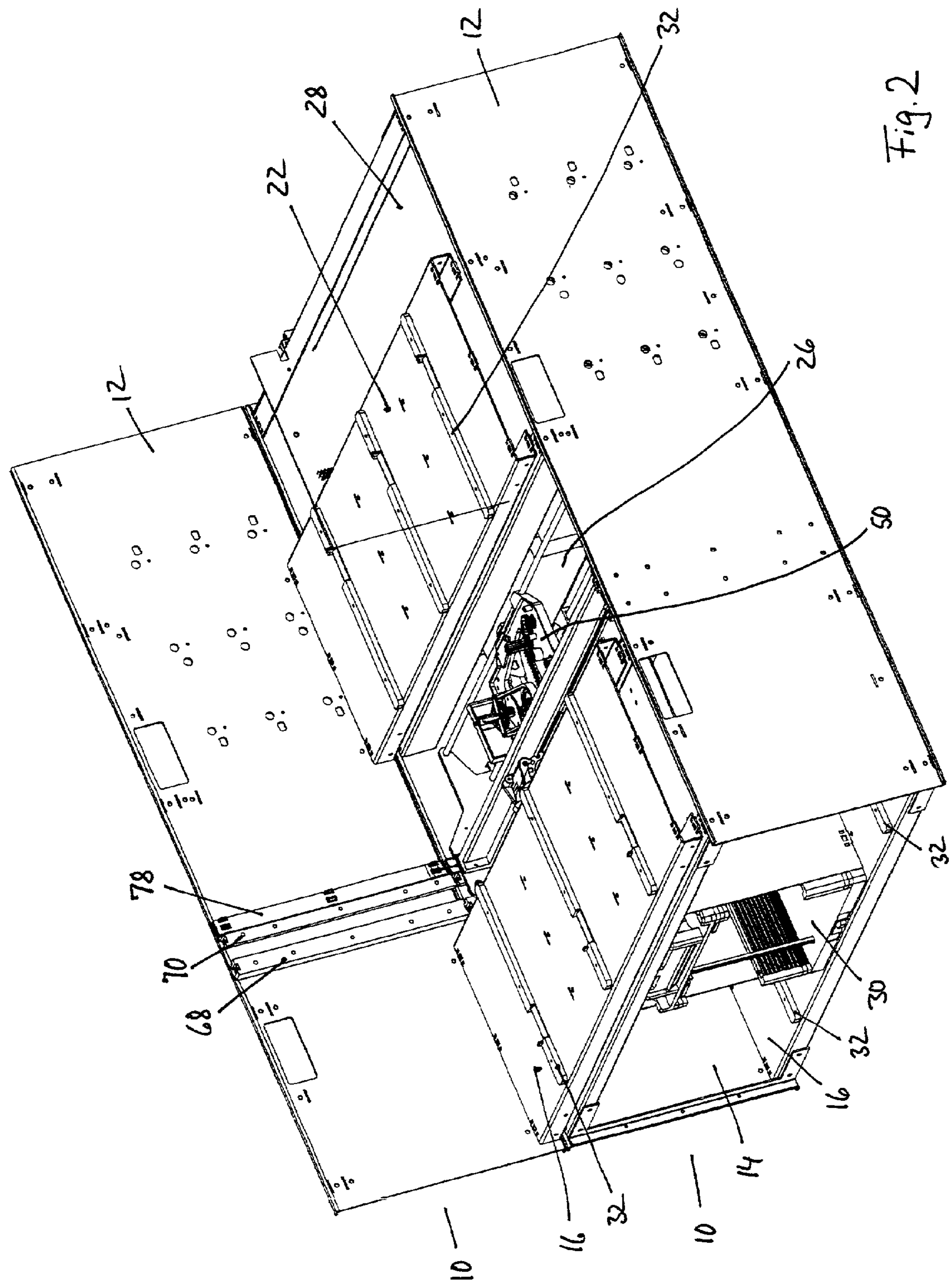
FIG. 2 is a perspective view of the front side of the module housing illustrated in FIG. 1.
Figure 3:
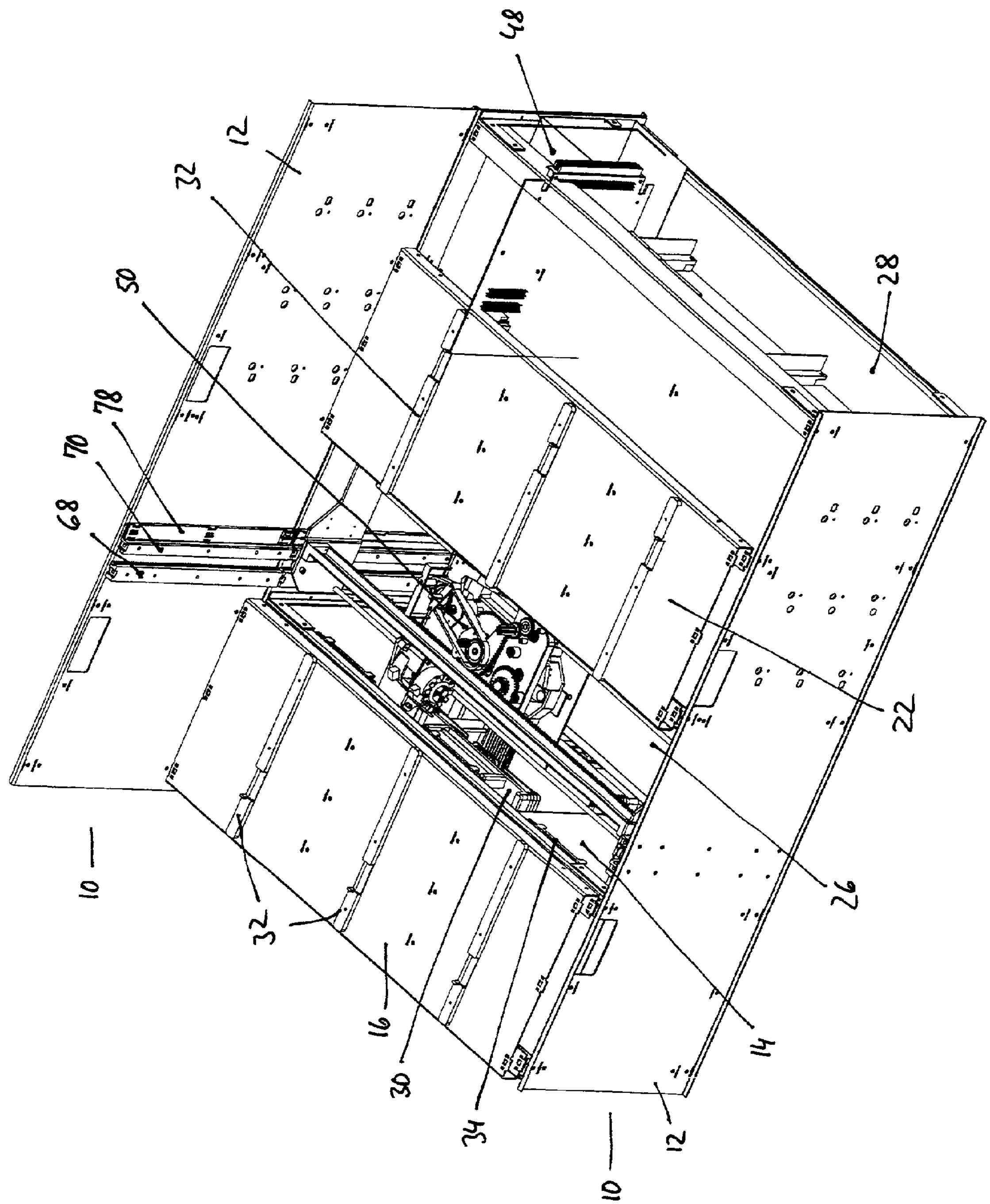
FIG. 3 is a perspective view of the rear side of the module housing illustrated in FIG. 1.
Figure 4:
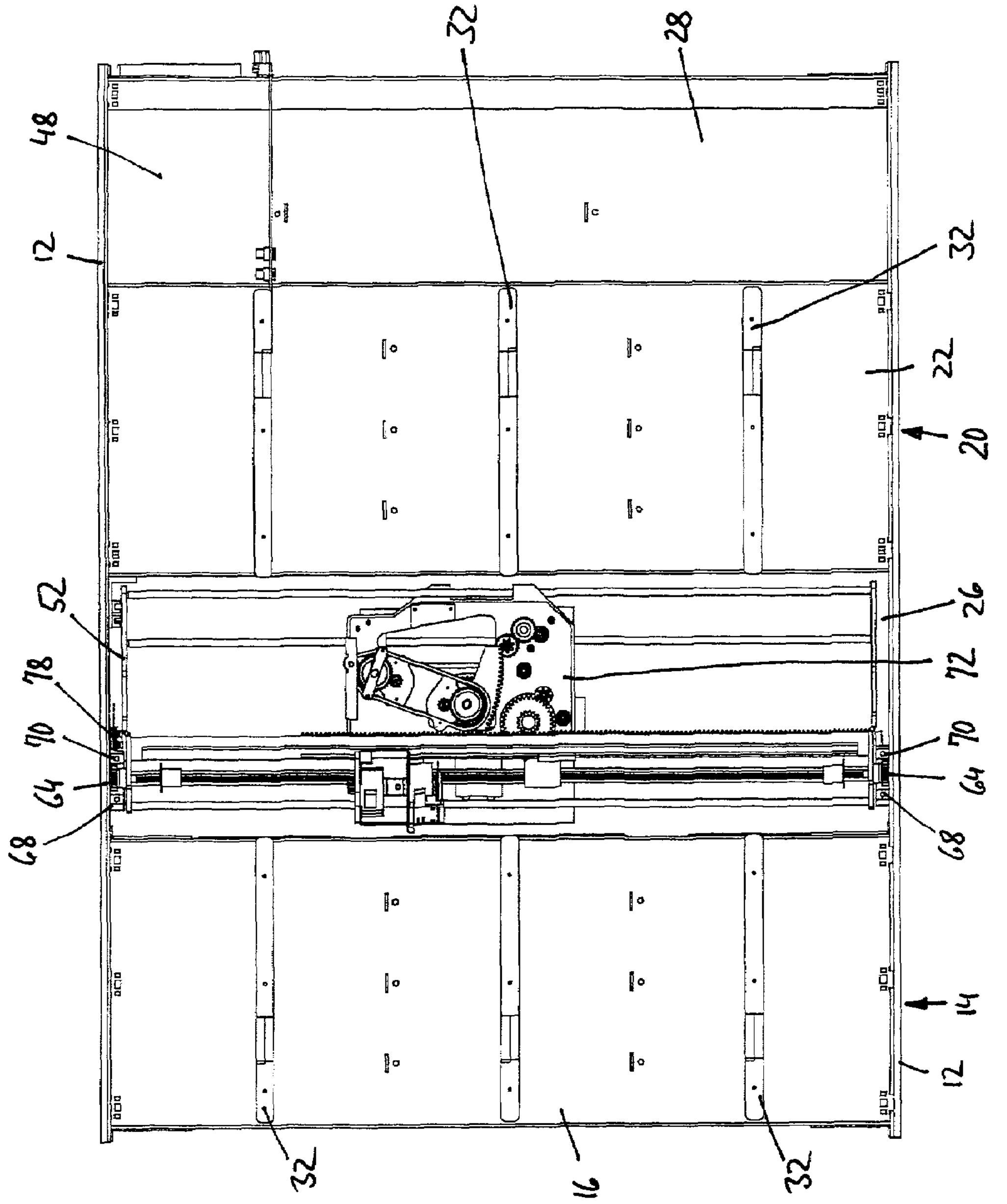
FIG. 4 is a top view of the module housing, with the top cover removed.

One embodiment of the invention is comprised of a modular system having module housings that can be modularly assembled. Each module housing has a front chamber and a rear chamber, with an open shaft being arranged between the front chamber and the rear chamber. Interchangeable storage modules, which can hold the respective storage media, can be inserted into the front chamber that is accessible from the front side. Function modules, such as the drives for the storage media, may be inserted into the rear chamber. A transfer unit is arranged in the open shaft. The transfer unit has an elevator that can travel vertically. A carriage that can travel horizontally and has a grip mechanism for the storage media is arranged on the elevator. With the vertically traveling elevator and the horizontally traveling carriages on the elevator, the grip mechanism can be driven to any position of the storage module to remove or deposit a respective storage medium. In the same way, the grip mechanism can be driven in front of each function module to deposit or remove the respective storage medium there.

The arrangement of the storage module and the function module in the front chamber and the rear chamber of the module housing and the arrangement of the transfer unit between said chambers results in a compact construction of the module housing and a large storage capacity. Various storage modules can be inserted into the module housing, thus enabling a flexible use of the system for various storage media. Various function modules can be inserted into the rear chamber, with the number of the inserted function modules also being variable. For example, it is possible to insert two drives so that, with an alternating operation of the two drives, the storage media can be read in direct succession and without any time gaps. It is furthermore possible to insert additional function modules into the drives, such as a flipper that turns over two-sided written discs, or a CD burner.

Depending on the space requirement of the function module in the rear chamber, it is also possible to insert additional storage modules in said rear chamber.

The open shaft of the module housing makes it possible to stack two or more module housings on top of one another. The result is an open vertical shaft that passes through all module housings. The transfer unit and its elevator can travel in the through-shaft from one module housing into the module housing above or below, which allows for simple expandability of the system. Particularly, it is possible to stack additional module housings, which are equipped only with storage modules, onto a module housing with function modules. For example, they may have storage modules in the front as well as in the rear chamber. This enables a random expansion of the storage capacity. The modular expansion can be retrofitted without any additional installation effort.

The dimensions of the module housing may be chosen such that it can be preferably inserted into a conventional 19-inch rack.

Referring now to the drawings, a system in accordance with the invention is illustrated. The system comprises a module housing 10 into which storage modules and function modules can be inserted in a manner corresponding to the requirements of the user. For example, the storage modules can be magazines that hold CDs, DVDs or magnetic tapes. The function modules can be appropriate drives, such as CD drives, DVD drives or tape drives. Likewise, a flipper may be inserted as a function module to turn over disks that are, for example, writeable on both sides. The module housing furthermore has a transfer unit that transfers the disks or tapes between the storage modules and the function modules.

The module housings 10 can be used individually, for example, as a jukebox. Alternatively, it is possible to arrange two or more module housings 10 above one another, whereby a transfer unit can also travel vertically through two or more stacked module housings 10 to transfer disks or tapes between the modules of the various module housings 10. This allows a random modular expansion of the number of storage modules and thus the storage capacity, as well as an expansion of the number of the function modules. The individual module housings 10 of the system can be stacked on top of one another to stand freely. Preferably, the dimensions of the module housings 10 are such that they can be inserted into a conventional 19-inch rack.

FIGS. 1 to 4 show one complete module housing 10 onto which a second module housing 10 has been stacked. The stacked second module housing 10 is shown only partially to allow better visibility of the interior construction of the module housing 10.

The module housing 10 has the form of a cuboid with a width of preferably 19 inches and a height of preferably four to six U-raster units. The module housing 10 is open on the front side and the rear side and may be closed by the vertical sidewalls 12 on the sides. When the module housing 10 is assembled, the front side of the module housing 10 is accessible to the user. At the front side and parallel to the front side, the module housing 10 has a front chamber 14 that extends over the entire width of the module housing 10, is open at its front side and its rear side, and is closed on the bottom by a floor plate 16 and on the top by a cover plate 18. In the rear area of the module housing 10, a rear chamber 20 is arranged, which is also open on its front side and its rear side, and is closed on the bottom by a floor plate 22 and on the top by a cover plate 24. The rear chamber 20 extends parallel to the front chamber 14 across the entire width and height of the module housing 10. The front chamber 14 and the rear chamber 20 are spaced apart such that there is a vertical shaft 26 in the module housing 10 between the front chamber 14 and the rear chamber 20 which is open on the top and the bottom. In vertical direction to the front of the module housing 10, the front chamber 14, the rear chamber 20 and the shaft 26 each have a depth that corresponds to the dimensions of the storage module and the function module or the data storage media (e.g., disks, tapes). Furthermore, a reception space 28 is provided in the module housing 10 at the rear side of the module housing 10 behind the rear chamber 20.

As is shown most clearly in FIG. 1, storage modules can be inserted interchangeably into the front chamber 14. The storage modules can be inserted from the open front side of the module housing 10 into the front chamber 14, or they can be removed from said front chamber 14. The storage modules are preferably designed as magazines, each of which can accommodate several disks or tapes, for example. In the embodiment shown in the figures, three CD magazines 30 can be inserted side-by-side into the front chamber 14. In the illustrated example, only one CD magazine 30 is inserted in the center position, while the two side reception positions are free. To insert the CD magazines 30, guide rails 32 may be arranged on the floor plate 16, and guide rails 34 may be arranged at the cover plate 18. The guide rails 32, 34 may guide and lock the CD magazines 30 in the front chamber 14. The CD magazine 30 shown in the illustrated example may be designed in a known manner so that the CD magazine 30 can accommodate a plurality of horizontally stacked "naked" CDs. It is readily apparent that it is also possible to insert magazines for other data storage media into the front chamber 14, such as magazines for CDs or DVDs in caddies, or magazines where three to five magnetic tapes are arranged above one another. Magazines for caddies or tapes have a greater width than the CD magazine 30 shown in the illustration, so that only two such magazines may be inserted side-by-side into the front chamber 14, if the module housing 10 has a width of 19 inches, for example. The front chamber 14 is accessible to the user at the front side of the module housing 10 so that the user can switch the storage modules at any time to have other stored data available in the system. The storage modules are inserted into the front chamber 14 in such a way that the storage media are accessible and can be removed from the shaft 26.

In the rear chamber 20, function modules may be inserted to execute the respective desired functions. Such function modules may be drives for CDs, DVDs or tapes, for example. Furthermore, it is possible to insert a flipper as a function module to turn over disks that contain data on both sides. It is also possible to insert other devices such as a CD burner or a printer as function modules. The number of function modules that can be inserted into the rear chamber 20 depends on the width and height of the function modules. In the illustrated embodiment, six function modules are inserted, whereby two groups of function modules are inserted side-by-side and each group is comprised of three function modules arranged on top of one another. For example, two CD drives 36, one DVD drive 38, a flipper 40 and a CD burner 42 are inserted. The rear side chamber 20 may have vertical guide walls 44 with attached horizontal guide rails 46 for the function modules. The width of the function modules 36, 38, 40 and 42 may be such that only two function modules can be arranged side-by-side in the width of a 19-inch module housing 10. In addition to these two function modules, there may be free space 48 in the width of the rear chamber 20 which can be used to house the control electronics. The function modules are inserted in the rear chamber 20 in such a way that they are accessible from the shaft 26 for the transfer of the storage media.

The robotics for the operation of the function module and cables may be housed in the reception space 28 arranged behind the rear chamber 20. Thus, they may be arranged out of sight and protected on the rear side of the module housing 10, facing away from the user.

The rear chamber 20 may be used not only to receive function modules, but also to receive storage modules. For example, it is possible to use part of the rear chamber 20 to insert function modules and part to insert storage modules. This may increase the storage capacity of the system. If several module housings 10 are stacked in the jukebox system, the option shown in the illustration is particularly suitable to use the rear chamber 20 of a module housing to receive function modules and, in case of stacked additional module housings 10, provide the front chamber 14 as well as the rear chamber 20 exclusively for the reception of storage modules. This allows an almost limitless expansion of the storage capacity of the system. Accordingly, in the embodiment shown in the illustration, the rear chamber 20 is provided to receive CD magazines 30 in the same way as the front chamber 14 when the upper module housing 10 is stacked, which is apparent because the floor plate 20 of the rear chamber 20 has the same guide rails 32 as the floor plate 16 of the front chamber 14.

Figure 5:
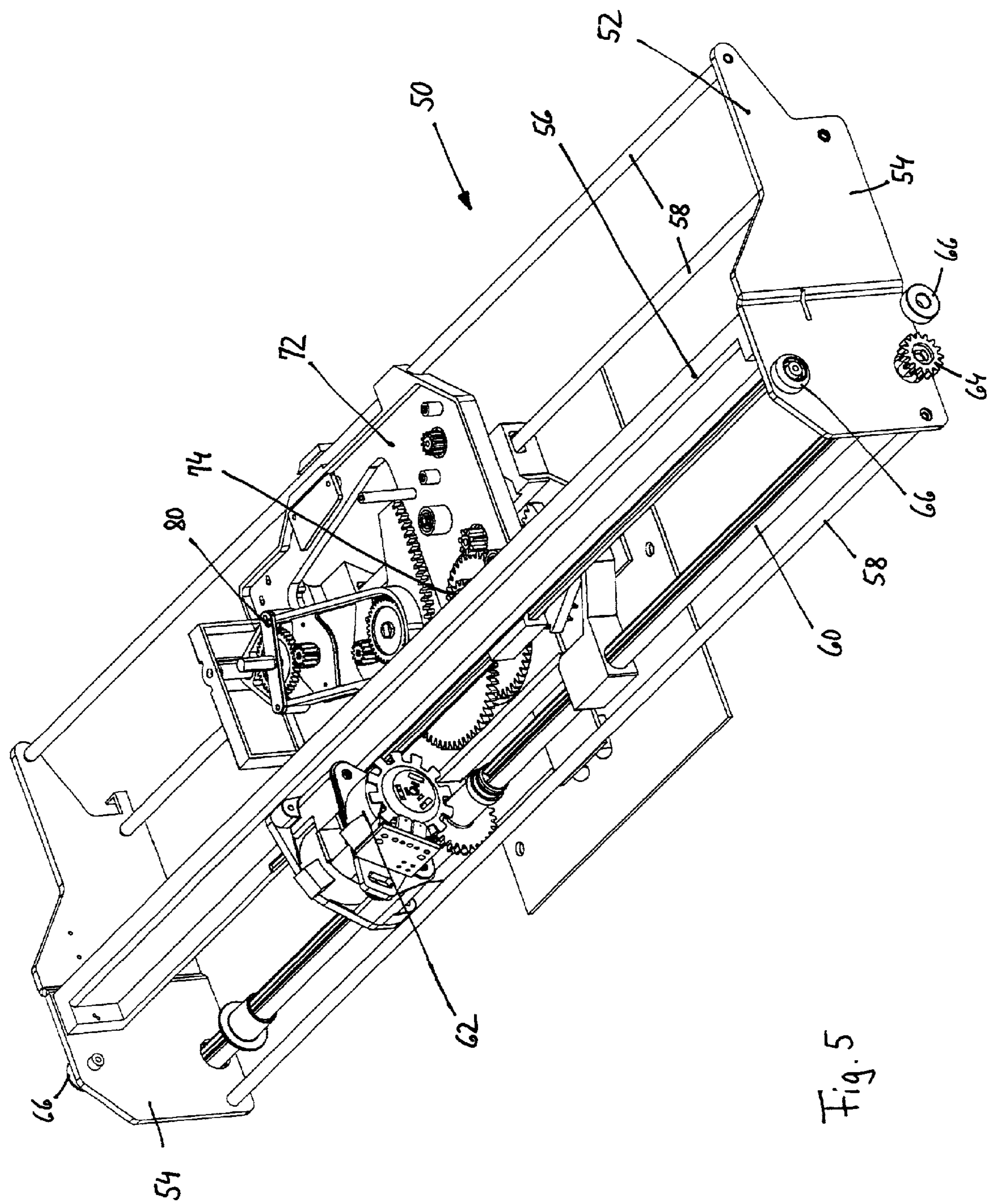
FIG. 5 is a perspective view of one embodiment of a transfer unit.
Figure 6:
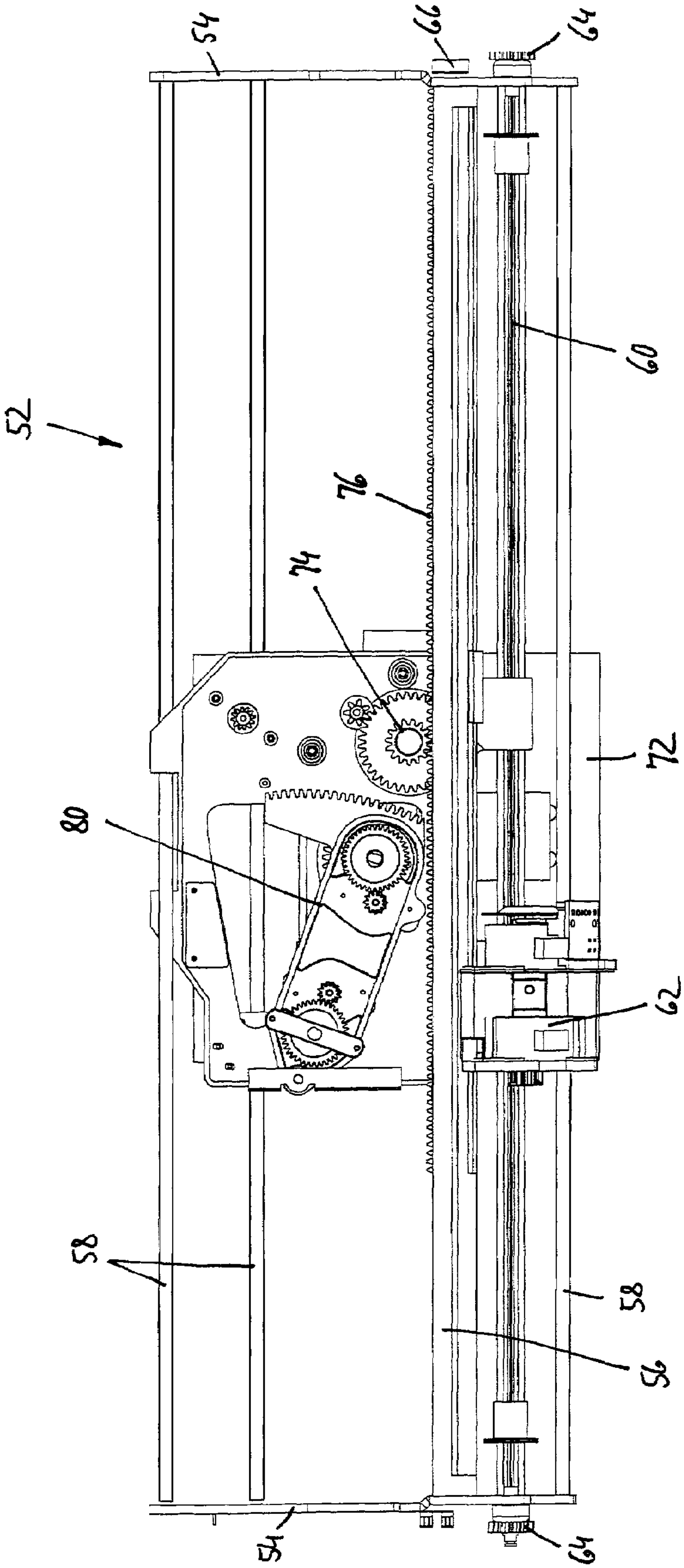
FIG. 6 is a top view of the transfer unit illustrated in FIG. 5.

A transfer unit 50, which is shown separately in FIGS. 5 and 6, is arranged in the open center shaft 26 of the module housing 10. The transfer unit 50 removes the data storage media (e.g., disks, tapes) from the storage modules and transports them to the function modules, and vice versa it again transports the data storage media from the function modules back to the storage modules.

The transfer unit 50 has an elevator 52. The elevator 52 has side bearers 54 that are connected by a cross strut 56 and guide rods 58. The elevator 52 is arranged horizontally and parallel to the chambers 14 and 20 in the shaft 26 so that its side bearers 54 are adjacent to the sidewalls 12 of the module housing 10. In the side bearers 54, a spindle 60 is arranged to rotate therewith, which can be controlled and driven by means of an electrical step motor 62. At both ends of the spindle 60, which project past the side bearers 54, one each pinion gear 64 is attached. Furthermore, two guide rollers 66 are run on the outside of the side bearers 54 to freely rotate therewith.

At the interior side of the side walls 12 of the module housing 10, a rack 68 and a guide bead 70 are arranged parallel side-by-side in the area of the shaft 26 vertically across the entire height of the side walls 12. The elevator 52 engages with the pinion gears 64 of its spindle 60 in the racks 68. Each of guide rollers 66 rests on the guide beads 70 with both sides. If the step motor 62 causes the spindle 60 to turn, the elevator runs up or down in the racks 68 by means of the pinion gears 64, depending on the turning direction of the spindle 60. In this way, the elevator 52 is guided by the guide rollers 66. Because each of the racks 68 and the guide beads 70 are guided to the upper and the lower edge of the open shaft 26, the racks 68 and the guide beads 70 of the stacked module housings 10 are in true alignment when the module housings 10 are stacked, as is shown in particular in the FIGS. 2 and 3. Thus, the elevator 52 can travel in the shafts 26 of the stacked module housings 10 vertically across several module housings 10.

A carriage 72 that can travel horizontally is arranged in the elevator 52. The carriage 72 is guided on the guide beads 58 and is driven by means of an electrical step motor that engages through a pinion gear 74 into a rack 76, which is arranged at the cross strut 56. By means of the step motor, the carriage 72 can travel horizontally in the elevator 52. The vertical travel of the elevator 52 in one or more stacked module housings 10 and the horizontal travel of the carriage 72 in the elevator 52, allow a controlled positioning of the carriage at each module in the front chamber 14 and the rear chamber 20 of each module housing 10. The power supply for the electrical motors and the control of the transfer unit 50 may be provided through a conductor rail 78 that runs parallel to the rack 68 and the guide bead 70 on an interior side wall 12 of the module housing 10. The drive control of the transfer unit 50 may be wireless, for example, through infrared signals. Thus, the transfer unit 50 can travel in a way that no problems associated with cables being dragged along are encountered. It is possible to stack the module housings 10 and to achieve a controlled travel of the transfer unit 50 through several module housings 10 without requiring additional connections or cables in the assembly of the module housing 10.

The carriage 72 may have a grip mechanism 80 that is driven by an electrical motor and controlled electronically, for example. Because the construction of the motor is not an object of the invention, it is not described here in detail. The function of the grip mechanism is described below in the following description of the method of operation.

In the system, the carriage 72 may be positioned in front of a storage module according to a control command. By means of the grip mechanism 80, a storage medium (e.g., disk, tape) may be pulled out of the storage module and positioned on the carriage 72. According to a control command, the carriage 72 may then travel to a function module (for example, a drive) and may be positioned in front of the function module. The function module may be operated by the robotics to eject the tray of the function module. The grip mechanism 80 may transfer the storage medium to the tray so that the storage medium can be inserted into the function module. Similarly, the function module can transfer a storage medium to the positioned carriage 72. The carriage 72 may then travel in front of a triggered storage module to again deposit the storage medium in the storage module by means of the grip mechanism 80.

If the function module is a flipper 40 that turns over a disk, the disk may be transferred to the flipper 40 by means of the carriage 72 and handed off to the flipper 40. Then the elevator 52 may travel vertically until the carriage 72 has sufficient vertical distance for the flipper 40 to turn over the disk around a horizontal axis. Then the elevator 52 may again travel vertically to the flipper 40 so that the grip mechanism 80 can take the now turned disk from the flipper 40.

As described, a modular system in accordance with the invention can be operated as jukebox with CD- and/or DVD magazines, for example. The modular system can also be operated as a tape library with magnetic tapes. A combination of the two systems is also possible, whereby disk drives as well as tape drives are used.

With several module housings 10 arranged above one another, it is also possible for two or more transfer units 50, for example for various storage media, to travel above one another in the same racks 68 and guide beads 70. This allows for a further increase in capacity, versatility and speed of the system.

While particular embodiments of the present invention have been disclosed, it is to be understood that various different modifications and combinations are possible and are contemplated within the true spirit and scope of the appended claims. There is no intention, therefore, of limitations to the exact abstract or disclosure herein presented.

List of reference symbols

| | |
|---|---|
| 10 | module housing |
| 12 | side walls |
| 14 | front chamber |
| 16 | floor plate |
| 18 | cover plate |
| 20 | rear chamber |
| 22 | floor plate |
| 24 | cover plate |
| 26 | shaft |
| 28 | reception space |
| 30 | CD magazine |
| 32 | guide rails (10) |
| 34 | guide rails (18) |
| 36 | CD drive |
| 38 | DVD drive |
| 40 | flipper |
| 42 | CD burner |
| 44 | guide walls |
| 46 | guide rails |
| 48 | space for electronics |
| 50 | transfer unit |
| 52 | elevator |
| 54 | side bearers |
| 56 | cross strut |
| 58 | guide rods |
| 60 | spindle |
| 62 | step motor |
| 64 | pinion gear |
| 66 | guide rollers |
| 68 | rack |
| 70 | guide beads |
| 72 | carriage |
| 74 | pinion gear |
| 76 | rack |
| 78 | conductor rail |
| 80 | grip mechanism |

What is claimed is:

1. A data storage system, comprising:

at least one module housing, said module housing having a front chamber and a rear chamber, said front and rear chambers running parallel to a front side of the module housing and extending across a width of the module housing;

an open shaft being arranged between the front chamber and the rear chamber, said shaft extending across the width of the module housing;

the front chamber houses at least two storage modules to hold storage media, the rear chamber houses at least one function module for the data storage media, at least one transfer unit arranged in the shaft, said transfer unit having a vertically traveling elevator and a horizontally traveling carriage, said carriage travels on the elevator between the front chamber and the rear chamber, said carriage having a grip mechanism for removing or depositing the data storage media; wherein the shaft is open on its upper side and its lower side so that an integral open shaft is created through all module housings when two or more module housings are stacked on top of one another.

2. The system in accordance with claim 1, wherein the shaft has vertical guides on both sides to guide the elevator.

3. The system in accordance with claim 2, wherein the elevator comprises an electrical motor adapted to drive pinion gears, said pinion gears being adapted to engage into vertical racks arranged continuously vertically on sidewalls of the module housing so the elevator can travel vertically.

4. The system in accordance with the claim 1, wherein the guides of the two module housings are in vertical alignment for at least one elevator when two module housings are stacked on top of one another so that said at least one elevator can travel continuously vertically in the connecting shafts of the stacked module housings.

5. The system in accordance with claim 1, wherein the storage modules comprise disk magazines for CDs and/or DVDs.

6. The system in accordance with claim 5, wherein the function modules comprise at least one disk drive.

7. The system in accordance with claim 6, wherein the function modules comprise a flipper and/or a CD burner and/or a printer.

8. The system in accordance with claim 1, wherein at least two module housings are stacked on top of one another, one of said module housings having at least one function module in the rear chamber and at least one other module housing having storage modules in the front chamber and the rear chamber.

9. The system in accordance with claim 1, wherein said module housing is adapted to be integrated into a 19-inch rack.

10. The system in accordance with claim 1, wherein the control of the transfer unit is wireless.

11. A data storage system, comprising:

a front chamber adapted to receive one or more modules;

a rear chamber adapted to receive one or more modules, said rear chamber being substantially parallel to said front chamber and being spaced apart from said front chamber, thereby forming an open shaft between said front chamber and said rear chamber;

at least one transfer unit arranged in said open shaft, said transfer unit having an elevator adapted to travel along a first axis, and a carriage adapted to travel on the elevator along a second axis, said second axis running perpendicular to the first axis, said carriage having a grip mechanism adapted to grip data storage media, wherein the shaft is open on its upper side and its lower side so that an integral open shaft is created through all module housings when two or more module housings are stacked on top of one another.

12. The system according to claim 11 wherein at least one of said rear chamber comprises at least one function module.

13. The system according to claim 11 wherein at least one of said front chamber comprises at least one data storage module, said data storage module being adapted to store data storage media.

14. The system in accordance with claim 11, wherein the carriage is further adapted to travel horizontally on said elevator.

15. The system according to claim 11, wherein the carriage is further adapted to travel on said elevator along a third axis.

16. The system according to claim 15, wherein the first, second and third axis define a Cartesian coordinate system.

17. A data storage system, comprising:

at least one module housing, said module housing having a front chamber and a rear chamber, said front and rear chambers running parallel to a front side of the module housing and extending across a width of the module housing;

an open shaft being arranged between the front chamber and the rear chamber, said shaft extending across the width of the module housing;

the front chamber houses at least two storage modules adapted to hold at least two different types of media, the rear chamber houses at least two function modules for the data storage media, and at least one transfer unit arranged in the shaft, said transfer unit having a vertically traveling elevator and a carriage, the carriage is adapted to travel horizontally on the elevator and between the front chamber and the rear chamber, said carriage having a grip mechanism for the data two different types of storage media, wherein the shaft is open on its upper side and its lower side so that an integral open shaft is created through all module housings when two or more module housings are stacked on top of one another.

* * * * *